United States Patent [19]

Dworschak et al.

[11] Patent Number: 5,445,803
[45] Date of Patent: Aug. 29, 1995

[54] METHOD AND A DEVICE FOR DECOMPOSING TRITIATED WATER AND FOR RECOVERING ELEMENTARY TRITIUM

[75] Inventors: Heinz Dworschak, Cardana Di Besozzo; Giovanni Modica, Milan, both of Italy

[73] Assignee: European Atomic Energy Community (Euratom), Plateau de Kirchberg, Luxembourg

[21] Appl. No.: 199,232

[22] Filed: Feb. 23, 1994

[30] Foreign Application Priority Data

Aug. 27, 1991 [LU] Luxembourg .............................. 87994

[51] Int. Cl.⁶ .............................. C01B 4/00; C01B 3/10
[52] U.S. Cl. .................................... 423/657; 423/249; 422/159
[58] Field of Search ...................... 423/580.2, 249, 657; 376/313, 310; 976/DIG. 3, 77; 95/45; 422/159

[56] References Cited

U.S. PATENT DOCUMENTS

| | | | |
|---|---|---|---|
| 4,490,349 | 12/1984 | Horvath | 423/657 |
| 4,657,747 | 4/1987 | Swansiger | 423/249 |
| 4,673,547 | 6/1987 | Iniotakis | 376/314 |
| 4,774,065 | 9/1988 | Penzhorn | 423/210 |
| 5,154,878 | 10/1992 | Busigin | 376/310 |

FOREIGN PATENT DOCUMENTS 12448 6/1980 European Pat. Off. .
140073 5/1985 European Pat. Off. .
316240 12/1987 Japan .

OTHER PUBLICATIONS

*The Importance of Metal Oxides on the Reaction Between Oxygen and Tritium on Stainless Steel*, P. A. Finn and E. H. Van Deventer, Fusion Technology, vol. 15, (Mar. 1989), pp. 1343–1348.

Primary Examiner—John Niebling
Assistant Examiner—Brendan Mee
Attorney, Agent, or Firm—Darby & Darby

[57] ABSTRACT

Process and device for decomposition of tritiated water and the recovery of elemental tritium ($T_2$) in which a metal is used which oxidizes in the presence of water according to the formula $$Me + xT_2O \rightarrow MeO_x + xT_2.$$

According to the invention, said metal is placed in an enclosure, a wall of which is selectively permeable to hydrogen and its isotopes; tritiated water is injected into the enclosure and the space behind said wall is made to communicate with an absorbing device for hydrogen and its isotopes. The injection of tritiated water and the communication with the absorbing device are stopped from time to time for the purpose of regenerating the metal by supplying hydrogen or deuterium to said space and by extracting water from the enclosure.

7 Claims, 1 Drawing Sheet

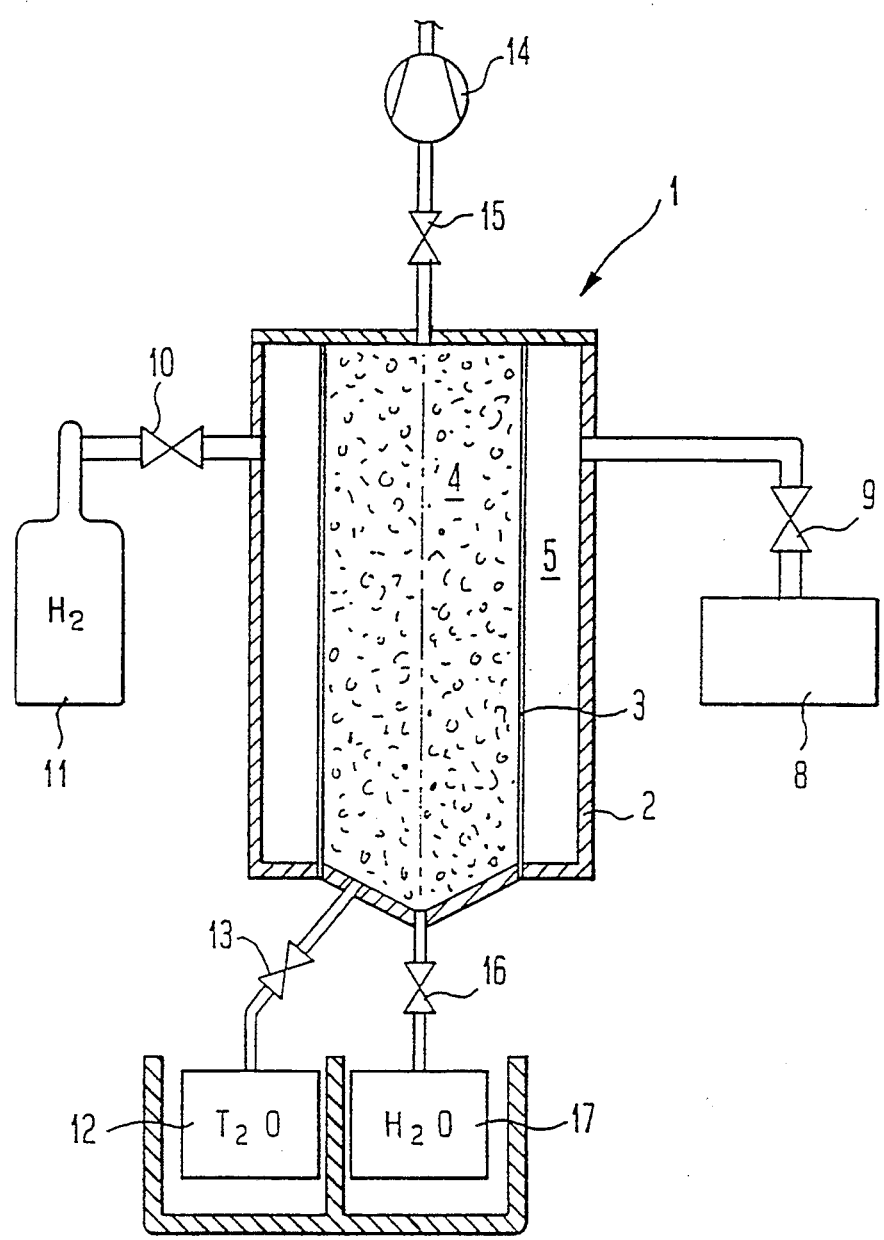

METHOD AND A DEVICE FOR DECOMPOSING TRITIATED WATER AND FOR RECOVERING ELEMENTARY TRITIUM

The invention refers to a method for decomposing tritiated water and recovering elementary tritium, in which a metal Me is used which oxides in the presence of water according to the formula $$Me + xT_2O \rightarrow MeO_x + xT_2$$

T designating tritium $^3H$.

Tritiated water is water of which at least certain hydrogen atoms are replaced by the tritium isotope. This iso-tope is very radioactive and grows in great quantity in a nuclear fusion reactor. Several methods are known for the recovery of tritium.

A first method uses the electrolysis of water in an acid or alkaline aqueous solution. At the present time, there are no electrolysis separators for this method which resist tritium over a long period of time. Due to this fact, the separators have to be replaced frequently and materials contaminated with tritiated water have to be handled. Furthermore, perforations in the separator have to be avoided, because in this case, an explosive mixture of hydrogen and oxygen is created. Finally, the elementary tritium obtained is always mixed with an important quantity of tritiated water and oxygen which have passed through the separator. Even more dangerous is the contamination of the oxygen stream by gaseous tritium.

A second known method uses a reaction with carbon oxide which leads to a water reduction and produces carbonic anhydride and hydrogen. This reaction makes use of catalysts and does not lead either to a total conversion of the tritiated water. A rather complicated purification of the gases leaving the reactor has thus to be carried out in order to eliminate the tritiated water which has not reacted as well as the carbonic anhydride and the carbon oxide. Furthermore, the formation of tritiated methane is observed due to the reaction between tritium and carbon oxide. Finally, the problem of the permeation of the materials of the reactor by the gaseous tritium increases with temperature, which, in the present case, amounts to at least 300° C.

Finally, it is known that tritium in the elementary state forms in an irreversible reaction with uranium or other metals which are then oxidized. This method suffers in particular from the mediocre output as far as the relation between the weight of the treated tritiated water and the weight of the employed metal are concerned. It has further been proposed to use iron for this reaction, but a type of iron of a particular morphology is needed, because otherwise a surface oxidation is observed which tends to stop the reaction rapidly. Furthermore, as in the preceding case, the tritium tends to pass through the structures of the reactor.

The invention thus aims at a method and a device for the decomposition of tritiated water which has a high output and which does not create any problem of permeation of the tritium through the constructive materials of the reactor.

According, to the invention, this aim is reached by the method as defined in the main claim. As for preferred embodiments of this method and as for the corresponding device, reference is made to the secondary claims.

The invention will now be described more in detail by means of an embodiment and the unique figure which shows schematically a device according to the invention.

The unique figure shows a tubular reactor 1 with double wall, the outer wall 2 of which is impermeable, especially for hydrogen and its isotopes, whereas the inner wall 3 is chosen to be easily permeable for hydrogen and its isotopes, while having a good resistance against corrosion by water at the reaction temperature which is situated between 3° and 700° C. Among the materials of this wall, tantalum, niobium, titanium, palladium, platinum and the alloys of palladium and silver can be cited.

The inner wall 3 surrounds a reaction chamber 4 which is filled with a metal such as iron, zinc, cobalt and nickel.

The space 5 between the two concentric walls 2 and 3 is connected to a device 8 for absorbing hydrogen and its isotopes through a valve 9. This device constitutes a hydrogen getter which is well known in the art.

Furthermore, this space 5 can be fed through a valve 10 with hydrogen coming from a source 11. The reaction chamber 4 is fed with tritiated water from a tank 12 to which it is connected by a valve 13.

A vacuum pump 14 can be connected through a valve 15 to this chamber 4 when the method is started, and the chamber comprises a water outlet which is connected by a valve 16 to a water collector chamber 17, this chamber being apt to be cooled by means (not shown) to the temperature of liquid nitrogen.

The method according to the invention proceeds roughly in two steps
1) decomposition of the tritiated water and oxidation of the metallic bed
2) regeneration of said bed.

When preparing the first step, a depression of some millibars is created in the chamber 4 by means of the pump 14 while the valve 15 is open. Simultaneously, hydrogen is injected into the space 5 by opening the valve 10. Hydrogen passes through the wall 3 due to the depression reigning in the chamber and reacts with metallic oxides possibly present in said metallic bed. Since the valve 16 is open, the collector chamber 17 which is at low temperature sucks up the water vapours. Then, the valves 15 and 16 are closed and valves 9 and 13 are opened. Now, the decomposition phase starts. The tritiated water present in the tank 12 is sucked into the chamber 4 and reacts there with the metal according to the above-mentioned formula. This reaction is enhanced by heating the chamber to a temperature which, in case of iron constituting the metal of the bed, is chosen between 300° and 450° C. For nickel or cobalt a higher temperature of 650° to 1000° C., and for zinc a lower temperature of 250° to 400° C. is chosen. This temperature defines, in combination with the morphology of the metal of the bed (granulometry, specific surface), the speed of reaction.

The molecules of hydrogen and its isotopes pass through the wall 3 and are immobilized in the getter 8, which is for example based on uranium, titanium or an alloy of zirconium and titanium. This hydrogen migration creates a certain partial depression in the chamber 4 due to which the tritiated water present in the tank is sucked up to the chamber 4 without the assistance of a pump. This step continues until saturation is achieved. Actually, the efficient metal surface in the chamber oxidizes progressively and the efficiency of decomposition decreases.

Then, the valve 9 is closed, either after predefined periods of time, or after having reached a predetermined saturation, and the regeneration step is prepared by cooling the tank 12 in order to invert the water stream and to capture in this tank all the tritiated water remaining in the chamber 4. Then, valve 13 is also closed and valves 10 and 16 are opened. The regeneration temperature of the metal bed in the chamber 4 is selected between 500° and 700° C. for iron, between 800° and 1000° C. for nickel and cobalt and between 350° and 400° C. for zinc.

The wall 3 is then traversed by hydrogen supplied by the source 10, and a reduction of the metal and a formation of light water according to the following formula is observed:

$$MeO_x + xH_2 \rightarrow Me + xH_2O$$

Since the collector chamber 17 is at $-196°$ C., the light water thus produced is transferred towards this chamber. Simultaneously, the getter 8 can be regenerated by heating. At a convenient temperature, the mixture of hydrogen isotopes which is captured therein is thus set free and can be treated in a step not shown for separating hydrogen isotopes in order to isolate tritium.

As soon as the reduction of the metal contained in chamber 4 is ended, the decomposition phase of the tritiated water is taken up again.

Among the materials constituting the bed in the chamber 4, iron is preferred, which is activated by a small quantity of copper, chromium, calcium, potassium or manganese (up to 5%). Preferably, the sum of chromium and copper content rises up to between 4 and 4.5 by weight. Such catalysts are obtained from an aqueous solution containing soluble iron salts (for example nitrates) as well as salts of said minority metals. A co-precipitation in form of hydroxides or hydrated oxides under controlled acidity condition is carried out. Then a filtering, a drying, a shaping (pastilles, grains), a calcination and a final reduction with hydrogen is carried out,.

The catalytic mass obtained by this method has a mean specific surface between 10 and 20 $m^2/g$.

One can also deposit catalytic metals on a porous support for example made of aluminium oxide, so that a large specific surface of the metal and simultaneously a support is obtained which is thermally and mechanically stable in the course of the multiple transitions between the reduced state and the oxidized state. The activation metals have an electro-chemical effect between iron, a less noble metal, and the other metal, which is more noble. Another effect is that the crystal structure of the reduced iron is deformed, thus creating centres sensitive to the reaction with water.

The deposition of these metals on the porous support can be realized by introducing the porous support into aqueous solutions of the salts of iron, chromium, manganese etc. for example nitrate, or else into solutions of organic salts in an organic solvent, for example acetyl acetonate. After disappearance of the solvents, the salt decomposes thermally in the air and oxides are obtained which can be reduced to the metal state by means of a treatment with hydrogen like during the regeneration phase.

Iron can further be deposited on zeolites, for example mordenites, starting from calcium mordenite and by means of a cation exchange calcium-iron and a subsequent reduction of iron present in the structure of the zeolite by means of hydrogen. Other convenient metals which can be deposited by the same method are zinc, nickel and cobalt.

Finally, in the method according to the invention, deuterium can replace the hydrogen supplied by the source 11, by which means heavy water is collected in the chamber 17.

We claim:

1. A method for decomposing tritiated water and recovering elementary hydrogen and its isotopes, said method comprising the steps of:

injecting tritiated water into a chamber having a wall which is selectively penneable to hydrogen and its isotopes;

reacting said tritiated water with a metal contained within said chamber at a temperature sufficient to oxidize said metal, thus releasing elemental hydrogen and its isotopes;

withdrawing hydrogen and its isotopes through said chamber wall;

absorbing such withdrawn hydrogen and isotopes; and periodically interrupting the injection of tritiated water into said chamber and regenerating said metal by introducing hydrogen and/or deuterium into said chamber and extracting water formed during such regeneration from said chamber.

2. The method of claim 1, wherein the metal is selected from iron, nickel, cobalt or zinc.

3. The method of claim 1, wherein the metal is heated to said required temperature.

4. A device for decomposing tritiated water and recovering elemental tritium, said device comprising:

a chamber having a first wall made of a material permeable to hydrogen and its isotopes, said material being selected from tantalum, niobium, titanium, palladium, platinum, or palladium-silver alloys;

a metal in elemental form contained within said chamber;

a second wall positioned around and spaced apart from said first wall, said second wall being impermeable to hydrogen and its isotopes;

a space defined between said first wall and said second wall;

a first liquid container for containing tritiated water to be treated;

a first inlet conduit, connecting said first liquid container to said chamber, for supplying tritiated water from said first liquid container to said chamber;

an absorption device for immobilizing elemental tritium;

a first outlet conduit, connecting said space to said absorption device, for conveying tritium from said space to said absorption device;

a gas container for at least one gas selected from elemental hydrogen and elemental deuterium, free of tritium;

a second inlet conduit, connecting said gas container to said space, for conveying said at least one gas from said gas container into said chamber;

a second liquid container for receiving water free of tritiated water; and a second outlet conduit, connecting said chamber to said second liquid container, for conveying water from said chamber to said second liquid container;

wherein each of said conduits has a valve therein and said device has;

a tritium recovery configuration in which the valves in said first inlet conduit and said first outlet conduit are open and said valves in said second inlet conduit and second outlet conduit are closed so that said first inlet conduit is adapted to supply tritiated water to said chamber to oxidize said elemental metal therein, and said first outlet conduit is adapted to convey tritium to said absorption device; and a regeneration configuration in which the valves in said first inlet conduit and said first outlet conduit are closed and the valves in said second inlet conduit and said second outlet conduit are open so that said second inlet conduit is adapted to convey said at least one gas, without tritium, into said chamber to form water and reduce said oxidized metal, and said second outlet conduit is adapted to convey the water so formed to said second liquid container.

5. The device of claim 4, wherein said first wall delimiting said chamber has a tubular cylindrical shape, said space being disposed around said wall in an annular disposition.

6. The device of claim 4, wherein said chamber is supplied with heating means.

7. The device of claim 4, further comprising a pump in fluid communication with said chamber.

* * * * *